(12) United States Patent
Gros et al.

(10) Patent No.: US 9,273,958 B2
(45) Date of Patent: Mar. 1, 2016

(54) ROTATION LASER

(71) Applicant: Robert Bosch GmbH, Stuttgart (DE)

(72) Inventors: Nicolas Gros, Stuttgart (DE); Isack Yeman, Stuttgart (DE); Heiko Fuellemann, Asperg (DE)

(73) Assignee: Robert Bosch GmbH, Stuttgart (DE)

(*) Notice: Subject to any disclaimer, the term of this patent is extended or adjusted under 35 U.S.C. 154(b) by 137 days.

(21) Appl. No.: 14/136,327

(22) Filed: Dec. 20, 2013

(65) Prior Publication Data

US 2014/0173921 A1    Jun. 26, 2014

(30) Foreign Application Priority Data

Dec. 21, 2012 (DE) .......................... 10 2012 112 834

(51) Int. Cl.
*G01C 5/00* (2006.01)
*G01C 15/00* (2006.01)

(52) U.S. Cl.
CPC .............. *G01C 15/00* (2013.01); *G01C 15/006* (2013.01)

(58) Field of Classification Search
CPC .... G01C 15/00; G01C 15/002; G01C 15/004; G01C 15/006
USPC .................................................... 33/290, 291
See application file for complete search history.

(56) References Cited

U.S. PATENT DOCUMENTS

| | | | |
|---|---|---|---|
| 2004/0078989 A1* | 4/2004 | Fai et al. .......................... 33/286 |
| 2009/0135401 A1* | 5/2009 | Nakaniwa ..................... 356/4.01 |
| 2013/0276315 A1* | 10/2013 | Kahle .............................. 33/228 |
| 2013/0293705 A1* | 11/2013 | Schorr et al. ................... 348/135 |
| 2014/0173921 A1* | 6/2014 | Gros et al. ....................... 33/228 |
| 2014/0182147 A1* | 7/2014 | Munroe et al. .............. 33/275 R |
| 2014/0237833 A1* | 8/2014 | Schubert et al. ................. 33/365 |
| 2015/0096180 A1* | 4/2015 | Johnson .......................... 33/228 |
| 2015/0176991 A1* | 6/2015 | Maruyama ...................... 33/291 |

* cited by examiner

*Primary Examiner* — G. Bradley Bennett
(74) *Attorney, Agent, or Firm* — Maginot, Moore & Beck LLP

(57) ABSTRACT

A rotation laser, in particular for surveying tasks, includes a remote control unit. The rotation laser has at least one operating mode necessary for measurement operation that is configured to be controlled exclusively by the remote control unit.

9 Claims, 2 Drawing Sheets

ROTATION LASER

This application claims priority under 35 U.S.C. §119 to patent application no. DE 10 2012 112 834.0 filed on Dec. 21, 2012 in Germany, the disclosure of which is incorporated herein by reference in its entirety.

BACKGROUND

A rotation laser, in particular for surveying tasks, has already been proposed.

SUMMARY

The disclosure is based on a rotation laser, in particular for surveying tasks.

It is proposed that at least one operating mode of the rotation laser necessary for measurement operation can be controlled exclusively by a remote control unit. In this context, a "rotation laser" is intended in particular to mean an instrument, known to the person skilled in the art, which is provided in order to determine and/or check horizontal height profiles, perpendicular lines, alignments and plumb points. In particular, the term "provided" is intended to mean specially programmed, configured and/or equipped. In particular, the rotation laser may have at least one laser beam which rotates and/or oscillates about an axis perpendicular to the laser beam and forms a reference plane. The laser may generate a visible reflection on the measurement points to be surveyed and/or may be detected in particular by a laser reception unit. Preferably, the rotation laser may be set up at a reference position, for example with the aid of a stand, and may comprise auxiliary means for orientation of the reference plane formed by the rotation laser beam, in particular for horizontal orientation of the reference plane. Depending on the desired surveying task, other orientations of the reference plane which appear suitable to the person skilled in the art may also be envisioned. An "operating mode" of the rotation laser, which is necessary for measurement operation, is intended in this context to mean in particular one of those operating modes of the rotation laser in which the rotation laser emits the at least one laser beam. In this context "controllable" is intended to mean in particular adjustable and/or modifiable, in particular activatable. Preferably, the remote control unit comprises at least one control panel which is provided at least for control of the rotation laser operating modes necessary for the measurement operation. Preferably, the remote control unit is provided at least in order to adjust a rotation operation and/or oscillation operation of the rotation laser and/or a rotation direction and/or a rotation speed and/or an oscillation frequency of the rotation laser. The remote control unit may have further functions which appear suitable to the person skilled in the art. In particular, the remote control unit may comprise an indicator unit which is provided in order to show information about the operating mode of the rotation laser to a user. In this context, "controllable exclusively by the remote control unit" is intended in particular to mean that the rotation laser itself is without means which are provided in order to adjust and/or activate operating modes necessary for the measurement operation. Measurement operation of the rotation laser cannot be started without the remote control unit. In particular, the rotation laser may be uncontrollable and/or useless for the user without the remote control unit. For a surveying task, the user may proceed to measurement points and other positions important for the surveying task while leaving behind the rotation laser without the remote control unit at the reference position. Theft of the rotation laser without the remote control unit may be unattractive, so that the risk of theft can be reduced.

Particularly advantageously, the rotation laser comprises a docking region, which is provided in order to accommodate a remote control unit. In particular, the remote control unit may be attached to the docking region and/or locked in the docking region. For locking the remote control unit, the rotation laser may preferably comprise suitable devices which are simple for the user to control, for example latching means, magnets and other locking means which appear suitable to the person skilled in the art. Particularly preferably, the control panel provided for controlling the rotation laser may be accessible, in particular easy to control, for the user when the remote control unit is attached to the docking region. The rotation laser may form a unit with the remote control unit, in particular for transport and/or storage. A risk of loss, in particular of the remote control unit, can be reduced. The rotation laser may be particularly easy to control when the remote control unit is attached. In particular, the control when the remote control unit is attached may be comparable with a rotation laser having an integrated control panel. The user can control the rotation laser particularly easily with a low risk of theft when the remote control unit is attached, by means of a control panel arranged with the remote control unit on the rotation laser.

A monitoring unit which is provided in order to identify a theft of the rotation laser is also proposed. Preferably, the monitoring unit is part of the rotation laser. In particular, the monitoring unit may be provided in order to identify a theft when the monitoring unit identifies movement of the rotation laser from the reference position. The monitoring unit may show the user when there is a theft and/or an attempted theft of the rotation laser. Preferably, the monitoring unit may deactivate at least the operating modes of the rotation laser which are necessary for measurement operation in the event of theft. The rotation laser may be unusable for a thief. In particular, the monitoring unit may stop the emission of laser beams of the rotation laser in the event of theft. Furthermore, the theft identification of the monitoring unit may be activated automatically when the remote control unit is removed from the docking region. It may also be the case that the monitoring unit is activated when the remote control unit is switched on. Preferably, the theft identification of the monitoring unit may be automatically deactivated when the remote control unit is attached to the docking region. The activation and/or deactivation of the theft identification of the monitoring unit may be carried out autonomously by control steps which are necessary during use of the rotation laser. Forgetting to activate the theft identification of the monitoring unit by the user may be avoided. Furthermore, it may be possible to activate and/or deactivate the theft identification of the monitoring unit on the remote control unit. The user may advantageously deactivate the theft identification without having to attach the remote control to the docking region, particularly in order to take the rotation laser to a new reference position.

It is furthermore proposed that the monitoring unit comprises at least one sensor, which is provided in order to detect at least one item of position and/or velocity and/or acceleration information. In particular, the sensor may be formed as a position sensor, velocity sensor and/or acceleration sensor. The monitoring unit may measure the acceleration over a period of time and calculate the distance traveled from these values. The monitoring unit may particularly simply identify a separation of the rotation laser from the reference position. In particular, a theft may be identified when the monitoring unit identifies a separation of the rotation laser from the reference position by a distance which is greater than a preset tolerance value. Particularly advantageously, the monitoring unit may comprise a sensor which is formed as a GPS sensor (Global Positioning System), and/or a comparable sensor which is provided for absolute position determination of the rotation laser, for example by identification and/or triangulation of radio sources and/or other position marks. The monitoring unit may advantageously determine a current location of the rotation laser. The monitoring unit may advantageously transmit the current location, in particular to the remote control unit and/or an information system. The user may query the location from the information system, in particular by means of a computer, smartphone or other aid which can be connected to the information system, in particular via a network such as the Internet.

It is furthermore proposed that the monitoring unit comprises at least one optical and/or acoustic signaling means for signaling a monitoring status. Preferably, the monitoring unit may signal activation of the theft identification by a signaling means which preferably shines green. Preferably, the monitoring unit may signal a detected theft by a signaling means which preferably shines red. Preferably, the monitoring unit may emit an alarm sound with the aid of the acoustic signaling means if a theft is identified. The signaling means may be arranged on the rotation laser. Preferably, the remote control unit may comprise further optical and/or acoustic signaling means of the monitoring unit. A monitoring status may be signaled particularly effectively. In particular, a theft of the rotation laser may be signaled particularly rapidly and effectively to the user and other persons present. A system having a rotation laser and at least one remote control unit is furthermore proposed. The remote control unit may be adapted particularly well to the rotation laser. In particular, the remote control unit may comprise a control panel, by means of which the operating modes of the rotation laser can be controlled, and the remote control unit may be accommodated particularly accurately by the docking region of the rotation laser.

A charging unit is furthermore proposed, which is provided in order to charge together an accumulator unit of the rotation laser and an accumulator unit of the remote control unit when the remote control unit is attached to the docking region of the rotation laser. In this context, an "accumulator unit" is intended to mean a rechargeable electrical energy storage device. The accumulator unit may be formed as a lead-acid accumulator, NiCd or NiMh battery, but in particular as a lithium-based battery. Other types of electricity storage devices known to the person skilled in the art may also be envisioned. Preferably, the charging device is part of the rotation laser. The rotation laser may advantageously comprise an interface, which is provided in order to couple the charging device to an external electricity supply and/or an external charger. The accumulator units which are necessary for operation of the rotation laser and the remote control unit may conveniently be charged together. In particular, the accumulator units may be charged while the rotation laser is stored together with the remote control unit.

It is furthermore proposed that the remote control unit comprises an indicator, which is provided in order to signal a state of charge of the accumulator units of the remote control unit and of the rotation laser. Preferably, the indicator comprises battery symbols which can signal accumulator units with a different state of charge, for example by the battery symbol being filled differently as a function of the state of charge. Preferably, the battery symbols flash during charging of the accumulator units and shine constantly for charged accumulator units. Preferably, the battery symbols are also shown when the rotation laser is switched off. The user may then rapidly and simply identify the state of charge of the accumulator units by looking at the remote control unit. In particular, the user can identify promptly when one of the accumulator units needs to be charged and/or replaced by a charged accumulator unit. Unplanned interruptions during the surveying of an area and/or terrain can be avoided.

It is furthermore proposed that the rotation laser and the at least one remote control unit comprise authorization units, which are provided for authorized coupling of the at least one remote control unit to the rotation laser unit. In particular, "authorized coupling" is intended to mean that only authorized remote controls can be used for controlling the rotation laser. In particular, an authorization code may be exchanged between the rotation laser and the remote control unit and/or encrypted data transmission may be provided. Various expedient methods which permit authorization of a remote control unit are known to the person skilled in the art. The authorization may be rigidly predetermined by the manufacturer or, preferably, performable by the user with the aid of further security measures, for example security keys and/or an authorization code. Preferably, for third parties who are not the rightful owner and/or user of the rotation laser, it may be impossible and/or at least made more difficult to authorize a remote control for use with the rotation laser. For example, a code which can be found only in the purchaser's documents, or is provided by the manufacturer only to the rightful owner, may be necessary for the authorization. It may furthermore be possible for the authorization to be possible only with a data link to an information system, in particular via the Internet, and for authorization of remote control units with rotation lasers reported as stolen to be denied. It is effectively possible to prevent the rotation laser from being controlled with an unauthorized remote control unit after theft.

In a particularly advantageous configuration of the disclosure, it is proposed that at least one remote control unit is formed as a laser reception unit. In this context, a "laser reception unit" is intended in particular to mean a unit which is provided for reception of the laser beam emitted by the rotation laser, in particular at a measurement point. The laser reception unit may be employed by the user in order to detect the laser beam and/or in order to determine a spatial position of a measurement point with the aid of the rotation laser. By forming the remote control unit as a laser reception unit, it is possible to obviate a further unit. The system, consisting of a rotation laser and a remote control unit formed as a laser reception unit, may comprise particularly few components. When searching for a measurement point with the laser reception unit, the user may control the rotation laser directly by means of the control panel arranged on the laser reception unit. The system may also comprise further remote control units which are provided exclusively for remote control of the rotation laser. The system may also comprise further laser reception units which are provided exclusively for laser reception. The system may also comprise further remote control units which are formed as laser reception units. The system may be adapted particularly flexibly to the requirements of the user and of the surveying task.

A remote control unit for a system having a rotation laser with the described properties is also proposed.

A method for the theft protection of a rotation laser with the described properties is also proposed. In particular, the method may comprise the monitoring unit being activated when the remote control unit is removed from the rotation laser and deactivated when it is attached, the monitoring unit identifying a separation of the rotation laser from the reference position in order to identify a theft, and the monitoring unit deactivating the rotation laser and/or at least emitting an alarm signal when a theft is identified.

The system according to the disclosure is not in this case intended to be restricted to the application and embodiment described above. In particular, in order to fulfill a functionality described herein, the system according to the disclosure may have a number of individual elements, components and units different from the number mentioned herein.

BRIEF DESCRIPTION OF THE DRAWINGS

Other advantageous features may be found in the following description of the drawings. An exemplary embodiment of the disclosure is represented in the drawings. The drawings, the description and the claims contain numerous features in combination. The person skilled in the art will also expediently consider the features individually and combine them to form appropriate further combinations.

FIG. 1 shows a rotation laser according to the disclosure with a remote control unit, and.

DETAILED DESCRIPTION

Figure 1:
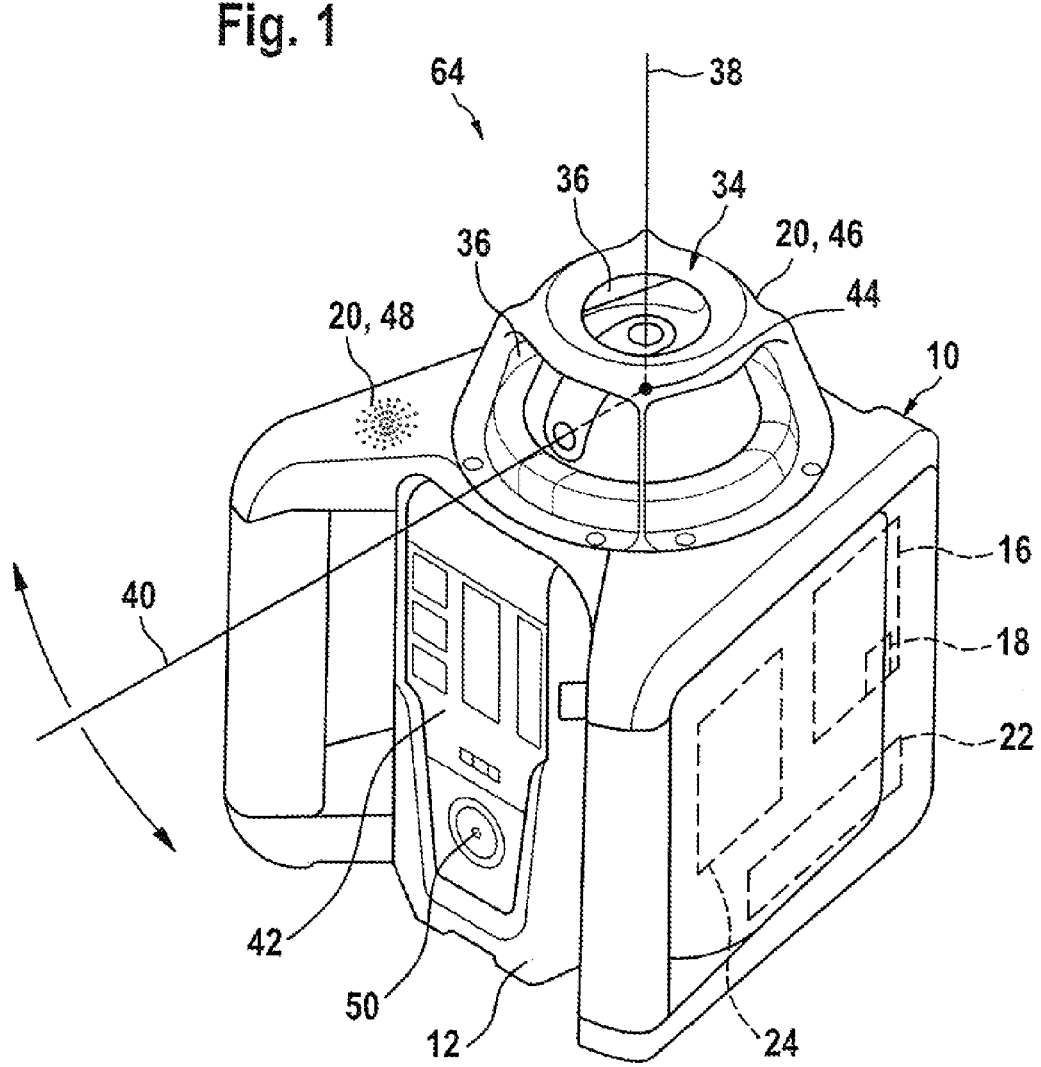

FIG. 1 shows a rotation laser 10 for surveying tasks. The rotation laser 10 comprises a rotation head 34 having exit openings 36. During the measurement operation, the rotation laser 10 emits from the exit openings 36 a vertical beam 38 and, perpendicularly to the vertical beam 28, a rotating or oscillating variable laser beam 40. The laser beam 40 oscillates or rotates in a reference plane perpendicular to the vertical beam 38, and is used for the surveying tasks.

The operating modes in which the laser beam 40 is emitted, which are necessary for measurement operation, can be controlled exclusively by a remote control unit 12. In FIG. 1, the remote control unit 12 is attached to a docking region 14 of the rotation laser 10, which is provided in order to accommodate the remote control unit 12 so that the remote control unit 12 forms a unit with the rotation laser 10. The remote control unit 12 comprises a control panel 42, which has control elements by means of which the operating modes of a measurement operation can be controlled by a user. In particular, with the aid of the control panel 42 the user can switch the laser beam 40 on and off and select an oscillation operation and a rotation operation of the laser beam 40, as well as adjust a rotation direction and/or speed and/or oscillation frequency.

Figure 2:
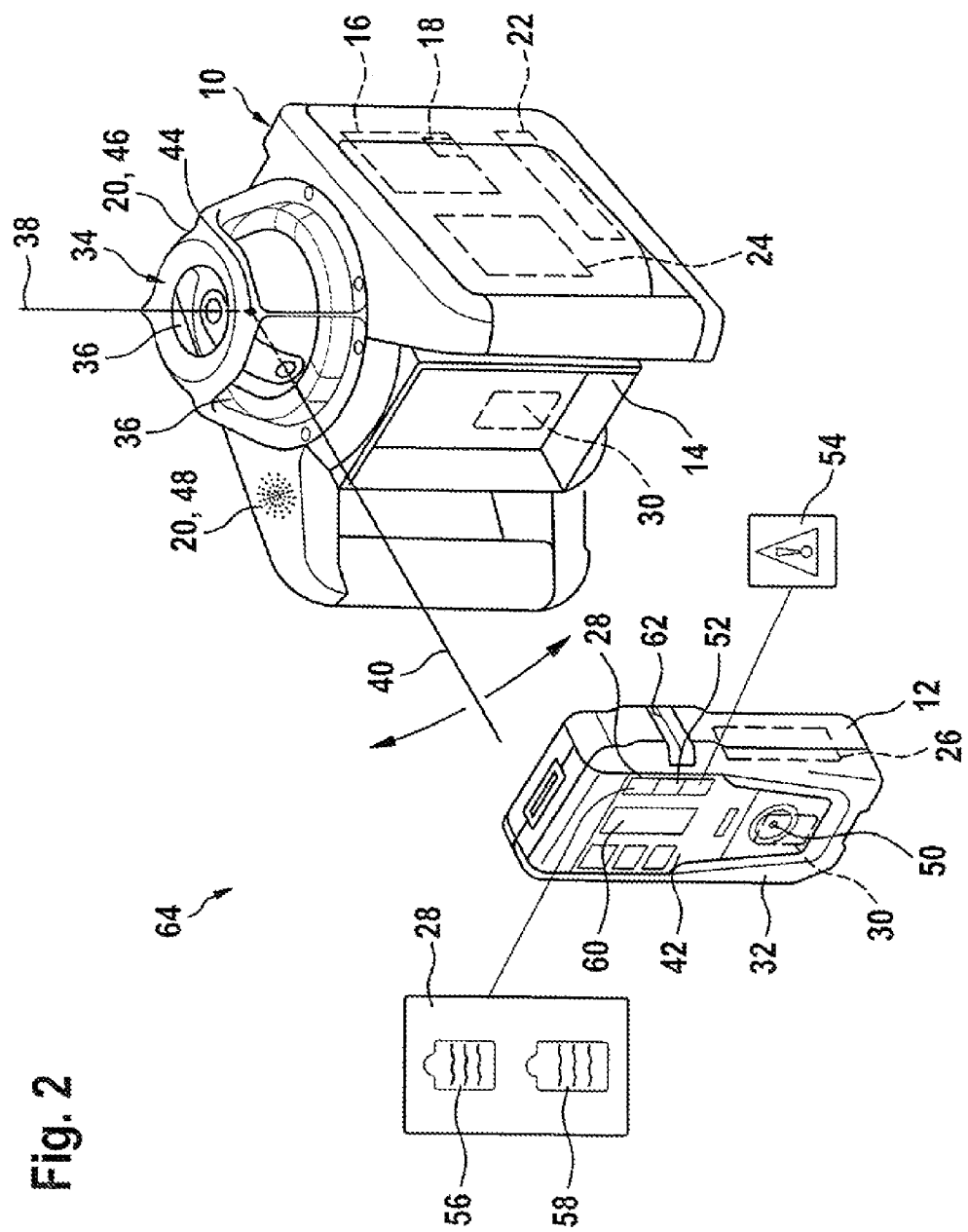
FIG. 2 shows the rotation laser with the remote control unit removed.

FIG. 2 shows the rotation laser 10 and the remote control unit 12 removed from the docking region 14 of the rotation laser 10. The rotation laser 10 does not have its own control panel, so that control is possible exclusively with the aid of the remote control unit 12. A monitoring unit 16 integrated in the rotation laser 10 is provided in order to identify a theft of the rotation laser 10. In order to carry out a survey, the user sets up the rotation laser 10 with the aid of a stand (not represented in detail here) at a reference position 44, from which the rotation laser 10 emits the laser beam 40. The monitoring unit 16 comprises a sensor 18, which is provided in order to detect acceleration information. To this end, the sensor 18 comprises an acceleration sensor which identifies an acceleration of the rotation laser in one translational degree of freedom. By measurement of the acceleration over a period of time, the monitoring unit 16 can identify when the rotation laser 10 has been moved away from the reference position 44. In a refinement, the monitoring unit 16 may comprise an absolute position measurement system, for example a GPS module (Global Positioning System) in order to determine an absolute location of the rotation laser 10.

The monitoring unit 16 comprises an optical and an acoustic signaling means 20 for signaling a monitoring status. The signaling means 20 are formed as a signaling light 46 and acoustic signal emitter 48 integrated into a protective basket of the rotation head 34. The monitoring unit 16 is activated automatically when the remote control unit 12 is removed from the docking region 14. Alternatively, it may be possible for the monitoring unit 16 to be activated after removal of the remote control unit 12, when the remote control unit 12 is switched on. The signaling light 46 begins to shine green in order to show activation of the monitoring unit 16. The monitoring unit 16 takes the location of the rotation laser 10 at the time of removal of the remote control unit 12 as a reference position 44, and signals when the rotation laser 10 is removed from the reference position 44 by a tolerance distance which is adjustable and/or stored in the monitoring unit 16. If the rotation laser 10 is removed from the reference position 44, the monitoring unit 16 signals a theft. The signaling light 46 begins to flash red and the signal emitter 48 emits an acoustic alarm signal. The monitoring unit 16 furthermore deactivates at least functions, in particular the laser beam 40, necessary for the measurement operation of the rotation laser 10. The remote control unit 12 likewise comprises signaling means 50, which when triggered by a remote control signal of the monitoring unit 16 signal the theft with an acoustic and optical alarm signal on the remote control unit 12. An icon 54 on the display 52 of the remote control unit 12 begins to flash and signals the theft. In addition, the monitoring unit 16 may have a wireless data link and, when a theft is identified, send the location of the rotation laser 10, determined by the monitoring unit 16, to an information system. The user can query the location, for example with the aid of a computer or a smartphone.

The user can deactivate the alarm by attaching the remote control unit 12 to the docking region 14 of the rotation laser 10, the monitoring unit 16 thus being deactivated. Furthermore, the alarm may be deactivated by an input on the remote control unit 12 or a further remote control unit connected to the rotation laser 10.

With the remote control unit 12, and alternatively with further remote control units, the rotation laser 10 forms a system 64. The rotation laser 10 comprises an integrated charging device 22, which is provided in order to charge together an accumulator unit 24 of the rotation laser 10 and an accumulator unit 26 of the remote control unit 12 when the remote control unit 12 is attached to the docking region 14 of the rotation laser 10. The accumulator units 24, 26 are formed by Li ion batteries. To this end, the user may supply the rotation laser 10 with electrical energy by means of an electrical connection (not represented in detail). Separate chargers for the rotation laser 10 and the remote control unit 12 can be obviated. The display 52 of the remote control unit 12 comprises an indicator 28, which signals the states of charge of the accumulator units 24, 26 of the remote control unit 12 and of the rotation laser 10 to the user. A first charging icon 56 shows the state of charge of the accumulator unit 24 of the rotation laser 10, and a second charging icon 58 shows the state of charge of the accumulator unit 26 of the remote control unit 12. The state of charge is represented by a number of bars which the charging icons 56, 58, formed as battery symbols, fill as a function of the state of charge. The charging icons 56, 58 are also shown when the rotation laser 10 is switched off. They flash during the charging process and shine continuously when the accumulator units 24, 26 are fully charged. The user can thus read the states of charge of the accumulator units 24, 26 on the remote control unit 12 at any time, even when he is not in the immediate vicinity of the rotation laser 10.

The rotation laser 10 and the remote control unit 12, as well as all further remote control units of the rotation laser 10, furthermore comprise authorization units 30 which are provided for authorized coupling of the remote control unit 12 and of the further remote control units to the rotation laser 10. The authorized coupling of a further remote control unit can only be carried out after input of an authorization code, assigned to the rotation laser 10 and unknown to a thief, on the remote control unit. It is thus effectively possible to prevent a thief from using the rotation laser 10 with an unauthorized remote control or deactivating an alarm with an unauthorized remote control.

The remote control unit 12 is formed as a laser reception unit 32. The laser reception unit 32 comprises a reception zone 60, which is provided in order to receive the laser beam 40 of the rotation laser 10. The reception of the laser beam 40 is shown on the display 52. The display 52 furthermore comprises direction indicators which show whether the laser beam 40 is being received centrally at a central marking 62 on the housing of the remote control unit 12. Using the remote control unit 12 formed as a laser reception unit 32, the user can survey measurement points with the aid of the rotation laser 10. In the simplest case, the system 64 may consist of a rotation laser 10 and a remote control unit 12 formed as a laser reception unit 32. Further separately formed laser reception units and/or remote control units can be obviated.

What is claimed is:

1. A system, comprising:
   a rotation laser; and
   at least one remote control unit,
   wherein the rotation laser has at least one operating mode in which the rotation laser emits at least one laser beam to perform a measurement operation configured to be controlled exclusively by the remote control unit, and
   wherein the rotation laser does not include a means for an operator to control or activate the at least one operating mode on the rotation laser.

2. The rotation laser according to claim 1, further comprising a monitoring unit configured to identify a theft of the rotation laser.

3. The rotation laser according to claim 2, wherein the monitoring unit comprises at least one sensor configured to detect one or more of at least one item of position information, velocity information, and acceleration information.

4. The rotation laser according to claim 2, wherein the monitoring unit comprises one or more of at least one optical signaling mechanism and at least one acoustic signaling mechanism configured to signal a monitoring status.

5. The system according to claim 1, further comprising:
   a docking region configured to accommodate the remote control unit; and
   a charging unit configured to charge together an accumulator unit of the rotation laser and an accumulator unit of the remote control unit when the remote control unit is attached to the docking region.

6. The system according to claim 5, wherein the remote control unit comprises an indicator configured to signal a state of charge of the accumulator units of the remote control unit and of the rotation laser.

7. The system according to claim 1, wherein the rotation laser and the at least one remote control unit comprise authorization units configured for authorized coupling of the at least one remote control unit to the rotation laser.

8. The system according to claim 1, wherein the least one remote control unit is configured as a laser reception unit.

9. The rotation laser according to claim 1, wherein the rotation laser is configured for surveying tasks.

* * * * *